United States Patent Office 3,784,498
Patented Jan. 8, 1974

3,784,498
PROCESS FOR PREPARING LOW EMULSIFIER SYNTHETIC LATEX
Gary W. Ceska, Coraopolis, Pa., assignor to Sinclair-Koppers Company, Pittsburgh, Pa.
No Drawing. Filed Apr. 21, 1972, Ser. No. 246,143
Int. Cl. C08d 1/09; C08f 1/13
U.S. Cl. 260—29.6 TA    4 Claims

ABSTRACT OF THE DISCLOSURE

A two-step process for preparing latices containing a small amount (0.1%) or no emulsifier comprising (1) polymerizing a 20–30% portion of one or more monomers with from 1–5% by weight based on total monomers of an ethylenically unsaturated carboxylic acid in aqueous acidic emulsion, and (2) adjusting the pH to 7.0–10.0 with aqueous ammonia, adding the remaining portion of monomers and polymerizing in aqueous basic emulsion to complete conversion.

BACKGROUND OF THE INVENTION

A primary factor governing the stability of emulsion polymers is the charge on the surface of the dispersed particles. When conventional soaps are the dispersants, this charge arises from the adsorbed soap molecules which are mobile and in dynamic equilibrium with similar molecules in solution.

The presence of the soaps often proves detrimental to the final properties of the latex. Thus the surfactant tends to reduce the moisture resistance of films or coatings made from the latices made in the presence of soaps. It is likely that surfactants are desorbed from the polymer particle to some extent during coalescence and drying of a latex film. If surfactant migrates to the air/coating interface, subsequent difficulties may be expected with intercoat adhesion, surface discoloration or water sensitivity. Migration of surfactant to the coating/substrate interface can decrease adhesion to the substrate.

It has been found that latices containing internally bound stabilizers are more stable to mechanical shear coagulation than latices containing the adsorbed surfactants because of the differences in the ability of charges to move about the surface of the particles.

Because of these and other problems, it is attractive to consider the possibility of preparing polymer latices which contain a minimum amount of adsorbed surfactant and a maximum amount of stabilizing groups which are not easily removable from the particle surface.

The present invention relates to a process for preparing stable latices having 0.1 or less percent by weight of added organic emulsifier such as a soap or a surfactant by providing a process for effectively placing chemically bound charges on the surface of the latex particles where it can most effectively stabilize the emulsion polymer.

SUMMARY OF THE INVENTION

In accordance with the invention, a stable latex is prepared from a total monomeric mixture consisting of from 1–5 percent by weight of at least one ethylenically unsaturated carboxylic acid and 99–95 percent by weight of one or more monomers copolymerizable therewith in an aqueous emulsion containing 0.1 or less percent by weight, based on the total monomeric mixture, of an organic emulsifier. In many instances, it is possible to omit the use of organic emulsifier completely.

The novel latices are prepared by a two-step process. In the first step, all of the carboxylic acid and a 20–30 percent portion of the one or more of monomers copolymerizable therewith are added to sufficient water to give a final latex having from 20–30 percent solids and containing the exceedingly small amount of emulsifier and a water soluble polymerization initiator. The resulting emulsion has a pH of from 2–4. The aqueous acidic emulsion is polymerized to from 60–100 percent conversion at a temperature of between 50 and 100° C. The pH of the resulting carboxylic acid containing latex is adjusted to between 7.0 and 10 with aqueous ammonia to give carboxylic groups on the surface of the latex particles.

In the second step, the remaining portion of the monomers copolymerizable therewith along with additional water soluble initiator are added to the aqueous basic emulsion and the emulsion polymerized at 50–100° C. until complete conversion is obtained. Any residual monomers are then stripped off and the pH adjusted to 8–9.5 if necessary to produce the final stable latex having from 35–55% total solids.

These latices are useful in textile backsizing, paper coating, metal coating, and other uses depending upon the particular chemical composition of the latex.

DETAILED DESCRIPTION OF THE INVENTION

The process of the invention is a two-step, pH variable procedure that has made possible the production of various trace (0.1 or less) surfactant and surfactant-free latices. With this procedure latices require no anionic or non-ionic surfactants, for stabilization is built into the emulsion particles by means of copolymerized acid. Among the advantages gained by the use of low-surfactant latices as compared with those containing high amounts of surfactant are improved wet strength properties, increased bond strength and quick set in textile applications, increased foldability in paper saturation applications, and improved color stability on heat aging.

In the first step of the method, the ethylenically unsaturated carboxylic monomer is copolymerized in an aqueous medium at pH 2–4 with only enough of the monomers copolymerizable therewith to give a solids content of between 20 and 30 percent. This step produces a carboxylated seed latex. On raising the pH of this low solids emulsion, the carboxyl groups ionize and the now highly charged latex particles provide an expedient locus for the generation of stable high solids latices. Neutralizing the carboxyl groups of the seed latex before adding the remaining comonomers induces the highly hydrophilic carboxylate ions to remain on the surface of the latex particle, nearer to the aqueous environment of the surrounding medium. Hence, the maximum stabilization capacity of the acid monomers is utilized.

In the second step, after the pH of the latex is raised to 7.0–10 by the addition of for example concentrated ammonia, the remaining monomers copolymerizable with the unsaturated carboxylic acid monomer are added and the emulsion polymerization completed to produce a latex having 35–55 percent solids.

The ethylenically unsaturated carboxylic monomers usable include the monocarboxylic acids such as acrylic acid, methacrylic acid, ethacrylic acid, and crotonic acid and the dicarboxylic acid such as itaconic acid, methyl itaconic acid, maleic acid, fumaric acid, mesaconic acid, citraconic acid and the like, as well as mixtures of these. Also usable are the lower alkyl half esters of the dicarboxylic acids such as methyl acid maleate, methyl acid fumarate, ethyl acid itaconate, and the like.

The monomers of copolymerizable therewith usable include any of the film-forming monomers normally used to prepare latices, such as aryl vinyl monomers, conjugated diolefins, ethylenically unsaturated primary amides, esters of acrylic and methacrylic acids, and mixtures of these.

The aryl vinyl monomers suitable for use as comonomers with the carboxylic monomers are styrene, substituted styrenes such as methylstyrene, dimethylstyrene, ethylstyrene, chlorostyrene, 2,4-dichloro-styrene, 2,5-dichlorostyrene, and divinyl benzene, alpha-methylstyrene, vinyl naphthalene, and the like, or mixtures of these monomers.

Examples of conjugated diolefins which may be used are 1,3-butadiene, 2,3-dimethyl-1,3-butadiene, 2-methyl-2,3-butadiene (isoprene), 2-chloro-1,3-butadiene (chloroprene), piperylene and the like.

Ethylenically unsaturated primary amides usable in the present invention would include acrylamide, methacrylamide, ethacrylamide, crotonamide, itaconamide, methyl itaconamide, maleamic acid, diacetone acrylamide and the like and their n-methylol derivatives.

Esters of acrylic and methacrylic acids usable are the alkyl esters made from alcohols having from 2 to 8 carbon atoms, such as methyl, ethyl, propyl, butyl, amyl, hexyl and 2-ethylhexyl acrylates and methacrylates.

The carboxylic acid monomer is used in amounts varying between 1 and 5 percent by weight of total monomers used. If less than 1 percent of acid monomer is used, the stabilizing effect of the acid may be insufficient to enable the first step of the polymerization to occur without the coagulation of the latex particles. The upper limit is much less critical, amounts as high as 10 percent may be used if desired, but the amounts greater than 5 percent are not necessary to provide stable latices.

When the lower limit of acid monomer is used it may be desirable to add up to 0.1 percent by weight of an organic surfactant. Various surfactants are usable, such as the alkyl aryl sulfonates, organo phosphate esters, sulfated esters of fatty acids, sodium dodecyl diphenyl ether disulfonates, dialkyl esters of succinic acid, and other water-soluble anionic surfactants. Also, non-ionic surfactants are usable, such as the alkyl phenyl polyethoxy ethanols, organo silicones, fluorocarbon surfactants, and the like. Also, mixtures of various well-known surfactants are usable and could be chosen by one versed in the art of emulsion polymerization.

It must be emphasized, however, that in the present invention if sufficient carboxylic acid monomer is used, many systems will not require the use of added surfactant. When added surfactant is used, amounts of 0.1 or less percent by weight is used, which is far below the normal amounts of from 2–4 percent of surfactant.

It is sometimes advantageous to use in the polymerization a chelating agent such as the tetrasodium salt of ethylenediamine tetraacetic acid. These chelating agents are known in the art for use in emulsion polymerizations and are generally used in an amount of about 0.01 percent based on total monomers.

The polymerization catalyst or initiator used to produce the latex of the present invention is chosen from the many which serve as a thermally activated source of free radicals, such as the organic peroxides, perbenzoates, and persulfates. Preferably, ammonium persulfate is used, as it provides efficient reaction rates and contains a fugitive cation and allows the retention of the amount of electrolytes at a low level. The amount of catalyst used is normally about 0.1 to 2.0 percent by weight based on total monomer, preferably about 0.25 to 0.50 percent.

Chain transfer agents may be used to regulate the average molecular weight of the polymer to a usable range. Those agents preferably used are the long chain alkyl mercaptans such as t-dodecyl mercaptan or tridecyl mercaptans. Other useful chain transfer agents may be used such as the lower alkyl xanthogens, alpha-bromoethylbenzene and carbon tetrabromide. The amount of chain transfer agent varies according to the transfer activity of the particular agent and is readily determined by one skilled in the art.

The polymerization is carried out in two steps. The first step is carried out in aqueous acidic emulsion, the amount of water being varied according to the solids content desired in the final latex. Generally preferred is a ratio of water to monomers such that a latex having a total solids content of from about 15 to 35 percent is produced. The preferred range of solids is from 20 to 30 percent.

In the first step, all of the acid monomer and a 20–30 percent portion of the one or more monomers copolymerizable therewith are added to sufficient water to prepare a latex containing 20–30 percent solids. To this mixture is added the chelating agent, chain transfer agent, surfactant if used, and 0.3–0.6 percent by weight based on the portion of monomers used of the initiator. The resulting mixture usually has a pH of 2–4.

The polymerization is carried out at a temperature conventionally used in polymerization, such as between 50 and 100° C., preferably at a temperature of 60–80° C. until between 60 and 100 percent conversion is attained. The preferred conversion to which this step is carried may depend on the monomers being polymerized. Thus, if a cross-linkable monomer such as butadiene is being polymerized, a more soluble polymer is formed at conversions of 60–70 percent. With most monomer systems, preferred conversion is 100 percent.

Upon completion of this step in the polymerization, the resulting latex is a carboxylic acid-containing seed latex containing 20–30 percent solids.

The seed latex is then adjusted to a pH of 7.0–10.0 with a base, preferably concentrated ammonia, to form an aqueous basic emulsion having the carboxylate ions on the surface of the latex particles. Other bases may be used, such as potassium hydroxide, morpholine, and the like.

In the second step, the remaining 80–70 percent by weight portion of the one or more monomers is added to the aqueous basic emulsion, along with an additional 0.05–0.25 percent by weight based on the portion of monomers of the initiator. Additional water may be added if necessary to produce a latex having the desired solids content. The polymerization is then resumed at a temperature between 50 and 100° C. until complete conversion of the monomers to polymer latex is achieved to form a latex having solids content of between 30–65 percent, preferably between 35 and 55 percent.

The pH of the resulting latex may have dropped slightly during this second polymerization step. After completion of the polymerization, the latex is adjusted to pH 7–9 and the residual monomers stripped off by usual means, such as raising the temperature or a combination of steam and vacuum. The resulting latex is then again adjusted to a pH of about 8–10, preferably with ammonium hydroxide, and is ready for use. If desired, an antioxidant may be added at this point.

The invention is further illustrated by the following examples, in which all percentages are percent by weight unless otherwise specified.

EXAMPLE I

To a 10 gallon stainless steel stirred reactor, there was charged an aqueous solution containing 13,500 g. of water, 45 g. of the tetrasodium salt of ethylenediamine tetraacetic acid, 2900 g. of styrene, 2400 g. of butadiene, 300 g. of acrylic acid, and 30 g. of ammonium persulfate as catalyst. The initial charge was heated with agitation at 70° C. for 6 hours until 25% solids had been formed in the mixture. The pH of the mixture was then raised to pH 7.5 by the addition of concentrated ammonia and then there was added continuously over a one hour period, a solution of 5300 g. of styrene, 4300 g. of butadiene, and 23 g. of ammonium persulfate in 600 g. of water. After the addition was complete, the contents of the reactor were held at 70° C. for 6 hours to obtain a latex having a percent solids of 52% and pH of 6.6. The latex was removed and placed in a stripper where the pH was raised to 8.0 by the addition of aqueous ammonia. The residual monomers were removed to a monomer content of 0.03 percent, during which time the pH of the latex again dropped. The pH of the final product was raised to 9.5 with concentrated ammonia. A high degree of mechanical stability was evident by the fact that after being subjected to shearing agitation in a laboratory mixer for 20 minutes, no separation of the emulsion occurred nor did the latex increase in viscosity. A 3 mil film of this product was cast upon a glass plate and air dried for one hour. On treating the film with drops of water, no opacity or loss of adhesion occurred, which shows the water resistance of the film was good.

EXAMPLE II

To a 32 oz. crown capped polymerization bottle was added 37 g. styrene, 25 g. butadiene, 3.0 g. itaconic acid, 0.1 g. ethylenediaminetetraacetic acid disodium salt as chelating agent, 0.3 g. potassium persulfate initiator, and 220 g. water. The bottle was capped and the mixture was polymerized at 65° C. for 12 hours. The bottle was then cooled and opened. The resulting latex had 22.9% solids and pH of 2.5. Sufficient ammonium hydroxide to adjust the pH to 8.0 was added to the latex. A mixture of 128 g. styrene and 85 g. butadiene was added, along with an additional 0.3 g. potassium persulfate as catalyst and the bottle was recapped. The mixture was then polymerized to completion at 70–75° C. The final latex had 48% solids and was mechanically stable although no surfactant had been used in the preparation.

In an identical experiment in which the itaconic acid was replaced by 6.0 g. acrylic acid, a mechanically stable latex was obtained which had the same percent solids as the above at both stages of the polymerization.

When either of the above experiments was conducted exactly as before except that the pH of the seed latex was left at 2.5, the resulting products were coagulated masses rather than stable latices.

EXAMPLE III

To a 32 oz. crown capped polymerization bottle was added 37 g. methyl methacrylate, 25 g. butadiene, 3.0 g. itaconic acid, 1.0 g. acrylic acid, 0,30 g. surfactant consisting of 0.15 g. dihexyl sodium sulfosuccinate, and 0.15 g. dioctyl sodium sulfosuccinate, 0.3 g. potassium persulfate initiator, and 220 g. water. The bottle was capper and the mixture was polymerized at 65° C. for 7 hours. The bottle was then cooled and opened. The resulting latex had 23.8% solids and a pH of about 2.5. Sufficient ammonium hydroxide to adjust the pH to 8.0 was added to the latex. A mixture of 108 g. methyl methacrylate, 72 g. butadiene, and 0.1 g. potassium persulfate was added and the bottle recapped. The mixture was then polymerized to completion at 70° C. for an additional 7 hours to give a final latex having 45.3% solids.

A similar run was made replacing the mixture of itaconic acid and acrylic acid with 3.0 g. acrylic acids. The final latex produced had 45.5% solids.

Both latices were mechanically stable and were evaluated as paper saturants. Paper saturated with these emulsions had good flexibility and wet strength.

Films cast in 3 mil thickness on glass plates from these two latices were baked for one hour at 150° C. and both films showed good resistance to heat discoloration.

EXAMPLE IV

To illustrate the effect of various carboxylic acids on the rate of polymerization in the initial step, a series of surfactant free polybutadiene latices was made in 32 oz. crown capped bottles using various acids. The formulations and the percent solids after 12 hours at 65° C. are tabulated in the table.

TABLE

| Run Number | 1 | 2 | 3 | 4 |
|---|---|---|---|---|
| Butadiene, parts | 55 | 55 | 55 | 55 |
| Itaconic acid, parts | 2.0 | | | |
| Acrylic acid, parts | | 2.0 | | |
| Methacrylic acid, parts | | | 2.0 | |
| Fumaric acid, parts | | | | 2.0 |
| Persulfate initiator, parts | 0.20 | 0.20 | 0.20 | 0.20 |
| Water, parts | 110 | 110 | 110 | 110 |
| Percent solids, 12 hrs | 15.2 | 17.3 | 22.0 | 13.1 |

All of the polymerizations proceeded slowly, but methacrylic acid provided the fastest rate, as shown in run No. 3. The pH of these first step runs was between 2.7 and 3.0.

Run No. 3 was treated with concentrated ammonia to adjust the pH to 8.0. An additional 65 parts of butadiene and 0.1 part persulfate were added and the run polymerized at 65° C. for an additional 14 hours until 60% conversion had been reached. The final latex had 36.4% solids with only a trace of curd. The latex had a swell ratio in toluene of 4.0. The run was taken to only 60% conversion to reduce the amount of cross-linking in the final polybutadiene. Samples run to 100% conversion produced stable latices having slightly lower swell ratios, indicating greater cross-linking of the rubber.

EXAMPLE V

To illustrate the utility of the process in preparing latices from other monomers, the following recipes were placed in 32 oz. crown capped bottles:

| Run Number | 1 | 2 | 3 |
|---|---|---|---|
| Styrene | 120 | 48 | 50 |
| Butylacrylate, g | | 72 | |
| 2-ethylhexyl acrylate, g | | | 79 |
| Methacrylic acid, g | 8 | 8 | 6 |
| Potassium persulfate, g | 0.8 | 0.8 | 0.8 |
| Water, g | 440 | 440 | 440 |

Bottles 1 and 2 were heated at 70° C. for 6 hours, while bottle 3 was heated at 65° C. for the same time. The latices produced in the first step had solids contents of 21.0, 22.4 and 23.1 for Nos. 1, 2, and 3, respectively. The pH of the latices was raised to 10.0 by the addition of concentrated ammonia, and sufficient monomer or monomers added to give a final product having approximately 40 percent solids. An additional 0.1 percent persulfate, based on monomer was added with the monomers. The polymerizations were the continued until conversion of monomer to polymer was essentially complete. The final latices had solids contents of 40.0, 41.0 and 47.0 for numbers 1, 2, and 3 respectively. The color stability on heat aging for 24 hours at 150° C. of films of the surfactant free styrene-acrylate latices was excellent and both imparted good flex properties to paper saturated with the latices and cured 10 minutes at 150° C. The polystyrene latex prepared in bottle No. 1 had excellent mechanical stability.

What is claimed is:

1. A process for preparing low emulsifier latex from a total monomeric mixture consisting of 1 to 5 percent by weight of at least one ethylenically unsaturated carboxylic acid selected from the group consisting of monocarboxylic acids, dicarboxylic acids, and mixtures of these, and 99 to 95 percent by weight of one or more monomers copolymerizable therewith and selected from the group consisting of aryl vinyl monomers, conjugated diolefins, ethylenically unsaturated primary amides, esters of acrylic and methacrylic acids, and mixtures of these, comprising:

(a) forming an aqueous acidic emulsion of all of the carboxylic acid and a 20 to 30 percent by weight portion of the one or more monomers in water containing up to 0.1 percent by weight of an organic emulsifier based on the total monomeric mixture and a polymerization initiator, said water being used in an amount such that the total solids content of the resulting latex will be 20–30 percent;

(b) polymerizing said aqueous acidic emulsion at a temperature of 50–100° C. to from 60 to 100 percent conversion to form a carboxylic-acid containing latex having 20–30 percent solids;

(c) adjusting the pH of the latex to a pH of 7.0–10.0 with aqueous ammonia to form an aqueous basic emulsion having the carboxylate ions on the surface of the latex particles;

(d) adding to said aqueous basic emulsion the remaining 80–70 percent by weight portion of the one or more monomers and an additional amount of the polymerization initiator; and (e) polymerizing the resulting mixture in aqueous basic emulsion at a temperature of 50–100° C. to complete conversion to form a latex having 35–55 percent total solids.

2. The process of claim 1 wherein the amount of organic emulsifier in the aqueous acidic emulsion is zero.

3. The process of claim 1 wherein the ethylenically unsaturated carboxylic acid is selected from the group consisting of acrylic acid, methacrylic acid, itaconic acid, and fumaric acid.

4. The process of claim 1 wherein the one or more monomers copolymerizable therewith is selected from the group consisting of styrene, butadiene, methyl methacrylate, butyl acrylate, 2-ethylhexyl acrylate, and mixtures thereof.

References Cited
UNITED STATES PATENTS 3,501,432    3/1970    Wright et al. _____ 260—29.6

FOREIGN PATENTS 678,279    9/1952    Great Britain _____ 260—29.6

WILLIAM H. SHORT, Primary Examiner

P. F. KULKOSKY, Assistant Examiner

U.S. Cl. X.R.

260—29.6 H, 29.7 H